United States Patent [19]
Doenges et al.

[11] Patent Number: 5,739,304
[45] Date of Patent: Apr. 14, 1998

[54] PROCESS FOR THE PREPARATION OF WATER-SOLUBLE AMINOALKYL DERIVATIVES OF POLYSACCHARIDES

[75] Inventors: Reinhard Doenges, Bad Soden; Rudolf Ehrler, Floersheim; Andreas Schrell, Frankfurt, all of Germany

[73] Assignee: Hoechst AG, Germany

[21] Appl. No.: 577,478

[22] Filed: Dec. 22, 1995

[30]     Foreign Application Priority Data

Dec. 24, 1994 [DE] Germany ............... 44 46 540.8

[51] Int. Cl.$^6$ ............... C07H 1/00; C07H 5/04; C08B 11/00; C08B 11/08
[52] U.S. Cl. ............... 536/18.7; 536/30; 536/43; 536/44; 536/45; 536/50; 536/52; 536/54; 536/55.1; 536/55.3; 536/123.1; 536/124
[58] Field of Search ............... 536/18.7, 30, 43, 536/44, 45, 50, 52, 54, 55.1, 55.3, 123.1, 124

[56]     References Cited

U.S. PATENT DOCUMENTS

| | | | |
|---|---|---|---|
| 2,591,748 | 4/1952 | Vaughan | 536/44 |
| 3,359,258 | 12/1967 | Toms | 536/43 |

FOREIGN PATENT DOCUMENTS

| | | |
|---|---|---|
| 0546476 | 6/1993 | European Pat. Off. . |
| 1 543 008 | 7/1969 | Germany . |
| 1946722 | 5/1971 | Germany . |
| 2842217 | 4/1980 | Germany . |
| 1072021 | 6/1967 | United Kingdom . |
| 1315508 | 5/1973 | United Kingdom . |

OTHER PUBLICATIONS

*Polymer*, vol. 2, Ed., Jakubovic et al, Anion Exchangers Based on Cellulose: I. Preparation and General Properties, 1961; London.

Textile Research Journal, vol. XXIII, No. 8, Aug. 1, 1953, pp. 522–527.

*Primary Examiner*—John Kight
*Assistant Examiner*—Everett White
*Attorney, Agent, or Firm*—Connolly & Hutz

[57]     ABSTRACT

Water-soluble polysaccharides which contain
 a) substituents selected from the group consisting of alkyl, hydroxyalkyl, carboxyalkyl and sulfoalkyl,
 b) N,N-disubstituted aminoalkyl groups,
are prepared by alkylation of a polysaccharide in the presence of a base with one or more alkylation reagents, selected from the group consisting of compounds transferring alkyl groups, compounds transferring hydroxyalkyl groups, compounds transferring carboxyalkyl groups and compounds transferring sulfoalkyl groups, and also with an N,N-disubstituted amino-alkylsulfuric acid ester. The modified polysaccharides are used in paper production and wastewater purification and also in cosmetics.

8 Claims, No Drawings

PROCESS FOR THE PREPARATION OF WATER-SOLUBLE AMINOALKYL DERIVATIVES OF POLYSACCHARIDES

FIELD OF THE INVENTION

The present invention relates to a process for the preparation of water-soluble polysaccharides containing N,N-disubstituted aminoalkyl groups.

DESCRIPTION OF THE PRIOR ART

On account of their extremely favorable toxicological and ecotoxicological properties, nitrogen-containing "cationic" carbohydrates of natural origin such as chitin and chitosan, and their water-soluble derivatives, have found a large number of areas of application. By way of example, use in medicine, in cosmetics, in the foodstuffs sector, in waste water treatment, in plant protection and in biotechnology should be mentioned here (review: Chitin and Chitosan Sources, Chemistry, Biochemistry, Physical Properties and Applications, Ed. by G. Skåak-Braek et al., Elsevier Applied Science, New York, London, 1989).

The laborious preparation and the associated high price of the nitrogen-containing polysaccharides is at present still an obstacle to wide industrial use of these natural products. Furthermore, in the case of natural products the user is restricted to the level of the degree of substitution.

In order to avoid these disadvantages, several processes were developed in order to cationize reasonably priced and readily accessible polymeric carbohydrates, such as starch or cellulose or their derivatives, with the aid of chemical methods.

Polysaccharides containing N,N-disubstituted aminoalkyl groups are basically disclosed in DE-A 19 46 722. However, the chloroalkylamines, which are known to be toxic, are employed for their preparation.

U.S. Pat. No. 3,359,258 describes a process for the preparation of N,N-diethylaminoethylcellulose, in which aminoethylcellulose is first prepared and subsequently the final product is obtained by ethylation of the amino group. The disadvantage of this process is the required alkylation of the aminoethylcellulose. Moreover, there is the danger that a possibly unexpected alkylation also takes place on further groups suitable for this purpose.

DE-A 28 42 217 discloses a process for the preparation of β-aminoethers by alkylation of compounds containing hydroxyl groups, which have no primary or secondary amino groups, with the aid of aminoethyl sulfates monosubstituted on the nitrogen. The disadvantage of this process is to be seen in the fact that the compounds employed for the alkylation have to be capable of aziridine formation.

The review article in Polymer 2, pages 18–26 (1961) describes the preparation of water-insoluble cellulose ethers by reaction of alkali metal cellulose with N,N-dialkylaminoethyl sulfates. The cellulose derivatives prepared in this way are used as ion exchangers.

EP-A 0 546 476 describes the modification of cotton fibers with sulfatoethylamines with the aim of better dyeability, in particular with reactive dyes.

It was therefore an objective of the present invention to make available a process for the preparation of water-soluble polysaccharides containing N,N-disubstituted aminoalkyl groups, which works without toxic cationization reagents.

SUMMARY OF THE INVENTION

The invention relates to a process for the preparation of water-soluble polysaccharides containing a) substituents selected from the group consisting of alkyl, hydroxyalkyl, carboxyalkyl and sulfoalkyl, b) N,N-disubstituted aminoalkyl groups, by alkylation of a polysaccharide starting material in the presence of a base with one or more alkylation reagents, selected from the group consisting of compounds transferring alkyl groups, compounds transferring hydroxyalkyl groups, compounds transferring carboxyalkyl groups and compounds transferring sulfoalkyl groups, and also with an N,N-disubstituted aminoalkylsulfuric acid ester.

Optionally, the starting material can be a polysaccharide ether, i.e. a polysaccharide which has already been alkylated with one or more of the alkylation agents mentioned above. In this case the polysaccharide ether can be reacted directly with the N,N-disubstituted aminoalkylsulfuric acid ester.

DETAILED DESCRIPTION

The term "polysaccharides" is understood according to the invention as meaning all oligomeric and polymeric carbohydrates, for example starches, guarans, alginates and in particular celluloses. Polysaccharides can be modified in various ways, including etherification, esterification, and the like. Typical polysaccharides have repeating glucose or similar monosaccharide units which can be α- or β-linked. In an essentially unesterified and unetherified polysaccharide, each monosaccharide unit typically has three hydroxide (OH) groups available for esterification or etherification, one of these hydroxides being in the form of a primary alcohol, i.e. a methylol (—$CH_2OH$) group, and the other two being in the form of secondary alcohols. Thus, the maximum degree of substitution (D.S.) per monosaccharide unit is normally 3 (3 mol substituents/mol monosaccharide unit), but the properties of a polysaccharide can be affected with a mean D.S. as low as about 0.01. Essentially unetherified polysaccharide starting materials of this invention can be considered to those having a D.S. less than 0.01, e.g. zero.

Polysaccharides can be essentially completely insoluble, as in the case of high molecular weight celluloses, or they can have varying degrees of compatibility with water, as in the case of most starches and gums. Their average molecular mass can range from about 10,000 to about 350,000 g/mol. The molecular mass can be measured by various techniques including solution viscosity. If necessary, the polysaccharide can be etherified to increase its solubility prior to measuring its solution viscosity.

A variety of polysaccharide ethers (e.g. cellulose ethers) are commercially available and can be used as starting materials in one of the process alternatives or variants of this invention.

There are three such process variants, all of which produce a water-soluble polysaccharide ether product containing at least two types of substituents attached to the same or different monosaccharide unit or units of the polysaccharide chain: (i) an alkyl, hydroxyalkyl, carboxyalkyl, or sulfoalkyl substituent, or a combination of said substituents, and (ii) an N,N-disubstituted aminoalkyl group.

In the first process variant, a polysaccharide ether is obtained, either from a commercial source or by reacting an essentially unetherified polysaccharide, in the presence of a base, with one or a mixture of alkylating reagents selected from the group consisting of compounds transferring alkyl groups, compounds transferring hydroxyalkyl groups, compounds transferring carboxyalkyl groups and compounds transferring sulfoalkyl groups. The etherified polysaccharide reaction product can then be reacted with an N,N-disubstituted aminoalkylsulfuric acid ester. Use of a polysaccharide ether as the starting material has the advantage of eliminating the step in which an essentially unetherified polysaccharide is alkylated. Among the suitable commercially-prepared water-soluble polysaccharide ethers are the hydroxyethyl-, methyl-, carboxy- methyl- and hydroxy-propylcelluloses, -starches or -guarans. "Transferring", in this context, means that the alkylating agent forms the desired group through alkylation, whether or not the desired group exists as such on the alkylating agent. For example, ethylene oxide can form a hydroxyethyl group under the alkylating reaction conditions.

In the second process variant, a water-insoluble polysaccharide (which is essentially non-etherified) is reacted in the presence of bases first with an N,N-disubstituted aminoalkylsulfuric acid ester and the reaction product is then reacted with one or a mixture of alkylating reagents selected from the group consisting of compounds transferring alkyl groups, compounds transferring hydroxyalkyl groups and compounds transferring carboxyalkyl groups. This process has the advantage that after the first etherification step the sulfate formed as a by-product can be easily washed out with water and the final product can therefore be obtained free of sulfates.

The third process variant also starts with an essentially non-etherified polysaccharide. The polysaccharide is reacted in the presence of bases simultaneously with (1) one or a mixture of alkylating reagents selected from the group consisting of compounds transferring alkyl groups, compounds transferring hydroxyalkyl groups, compounds transferring carboxyalkyl groups and compounds transferring sulfoalkyl groups, and (2) an N,N-disubstituted aminoalkylsulfuric acid ester. The desired water-soluble polysaccharides containing N,N-disubstituted aminoalkyl groups can thus be obtained from an essentially non-etherified polysaccharide starting material in one reaction step.

The reaction of the aminoalkyl sulfates of the formula II with polysaccharides containing hydroxyl groups is carried out in all 3 process variants under alkaline catalysis. It is advantageous here to employ more than the amount of base which is necessary in order to neutralize the aminoalkyl sulfate. The amount of alkali additionally employed is preferably 0.2 to 4 mol, in particular 0.5 to 1.2 mol, per mole of aminoalkyl sulfate. The bases employed can be alkali metal and alkaline earth metal hydroxides. Those to be preferred are lithium, sodium and potassium hydroxide. The alkali metal hydroxide is employed as a concentrated aqueous solution (20 to 50% by weight). The reaction is carried out in the presence of preferably between 5 and 30 mol, in particular 7 to 16 mol, of water, per mole of monosaccharide unit.

The reaction temperature is preferably between 60° C. and 160° C., in particular between 80° and 120° C. Depending on the temperature and amount of catalyst, the duration of the reaction is preferably 2 to 20 hours; good yields are in particular achieved between 8 hours and 16 hours. In all procedures, it is advantageous to work under an inert gas atmosphere in order to avoid oxidative degradation of the polymer.

In the reaction of the aminoalkyl sulfates with carbohydrate polymers, it is possible to carry out the reaction in a homogeneous medium or in a multi-phase state.

For reaction in a homogeneous medium, solvents are suitable which can dissolve the reaction components aminoalkyl sulfate, polysaccharide, base and water and themselves cannot react or can only react to a limited extent with one or more reaction components. Suitable solvents are, for example, glycols or aprotic dipolar solvents such as dimethylformamide, dimethyl sulfoxide or N-methylpyrrolidone. The concentration of the reaction solution and thus the space yield is limited by the viscosity which occurs on dissolving the polysaccharides. This process can therefore be usefully employed with low molecular weight polysaccharides.

A process is to be preferred in which the polysaccharide is present not in the dissolved state but in a solid, only swollen aggregate state. The remaining reactants here are in the liquid phase. This can be achieved, on the one hand, by intensively mixing the components polysaccharide, alkali, water and aminoalkyl sulfate in a mixer in the ratios indicated above, exposing the mixture to the required reaction temperature for the abovementioned period of time, then neutralizing it and, if necessary, adding further working-up steps such as washing, extraction or dialysis.

On the other hand, it is possible additionally to add to the reaction mixture an inert suspending agent that must be constituted such that neither the starting materials nor the products significantly dissolve in it. A three-phase mixture is thereby obtained, consisting of a solid phase (polysaccharide) and two liquid phases (water, suspending agent). The amount of suspending agent is the 3 to 30-fold proportion by weight of the polysaccharide, preferably the 5 to 10-fold proportion by weight. Suitable suspending agents are all organic solvents which are unable to dissolve the carbohydrate polymer and are not decomposed under the alkaline reaction conditions. Particularly suitable suspending agents include various $C_1$ to $C_{12}$-organic liquids such as lower alcohols and ketones such as methanol, ethanol, propanols, butanols, acetone, methyl ethyl ketone, ethers such as diethyl ether, diisopropyl ether, dimethoxy-ethane, tetrahydrofuran and dioxane, amines such as triethylamine and tributylamine or hydrocarbons such as pentane, hexane or toluene. As a result of the addition of a suspending agent, the reaction mixture becomes readily stirrable, and the reaction can therefore be performed in normal stirring equipment. After the reaction time is complete, neutralization and working up are carried out as described above.

The N,N-disubstituted aminoalkyl group which is bonded via a hydroxyl group of the water-soluble polysaccharide product of the process is a group of the formula I

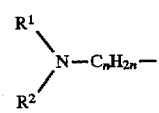

Formula I in which
$R^1$ and $R^2$ independently of one another are a $C_1$–$C_{18}$-alkyl radical which is optionally substituted by hydroxyl, alkoxy or amino groups or
$R^1$ and $R^2$ together are a cycloaliphatic radical having 4 to 10 carbon atoms, which is optionally substituted by hydroxyl, alkoxy or amino groups, it being optional for the alkyl radical or the cycloaliphatic radical additionally to contain oxygen, sulfur or nitrogen atoms, and n is an integer from 2 to 10, preferably 2 or 3.

The mean degree of substitution of the polysaccharides with substituents of the formula I is preferably 0.01 to 2.0 mol, in particular 0.02 to 1.0 mol, per mole of monosaccharide unit.

The substituents of the polysaccharides from the group consisting of alkyl, hydroxyalkyl, carboxyalkyl and sulfoalkyl are understood according to the invention as meaning the substituents known per se which, for example, impart water-solubility to polysaccharides. They are in particular hydroxyalkyl, carboxymethyl, methyl, ethyl, sulfoethyl and 2,3-dihydroxypropyl groups which are bonded to hydroxyl groups of the polysaccharides (K. Engelskirchen in Houben Weyl, Volume E 20, Part 3, p. 2042 ff). The introduction of these groups is prior art and therefore does not have to be explained further here. The reagents for the introduction of these groups (called group A in the following) are, for example, alkylene oxides, alkyl halides and vinyl compounds which can be grafted under free-radical conditions. Preferably, the degree of substitution is selected such that the final product is soluble to more than 95%, in particular more than 98%, in water with formation of a 0.5% strength solution.

The introduction of the N,N-disubstituted aminoalkyl groups according to formula I is carried out by reaction of sulfate esters of the formula II

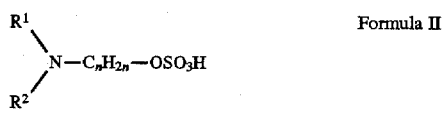

Formula II in which $R^1$, $R^2$ and H have the meaning indicated above, with hydroxyl groups of the polysaccharides with formation of an ether bond. Particularly to be preferred are aminoethyl sulfates (IIIb—VI-Ib) which can be obtained from accessible and reasonably priced N,N-disubstituted alkanolamines, for example dimethylethanolamine (IIIa), 2-dimethylamino-1-methylethanol (IVa), diethylethanolamine (Va), N-hydroxyethylpiperazine (VIa) or N-hydroxyethylpiperidine (VIIa), by esterification with sulfuric acid.

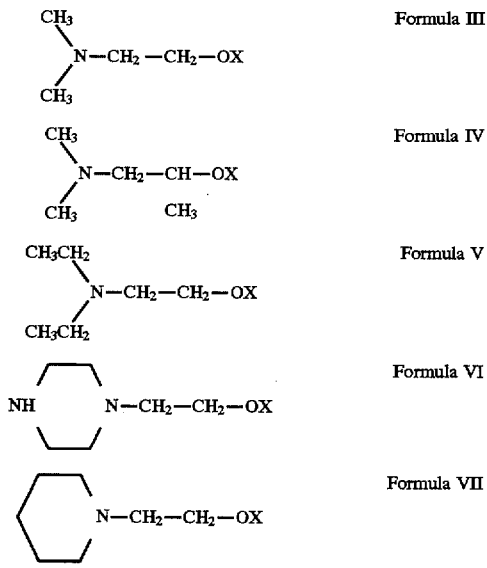

IIIa—VIIa: X=H
IIIb—VIIb: X=SO$_3$H

The water-soluble polysaccharides prepared by the process according to the invention are suitable as auxiliaries in the production of paper, as constituents of cosmetic preparations and as flocculating agents in waste water purification.

The parts and percentages indicated in the following examples relate to the weight if not stated otherwise.

EXAMPLE 1

Process Variant 1

80 g of hydroxyethylcellulose (Tylose® H 4000, Hoechst) are suspended in 400 g of isopropanol in a 2 litre glass reactor. A solution of 8.0 g of sodium hydroxide in 19 ml of water and 21.0 g of N-(2-sulfatoethyl)piperidine in 43 ml of water is added to this suspension. The reactor is closed and inertized with nitrogen. The mixture is stirred at room temperature for 30 min for homogenization. It is then heated to an internal temperature of 80° C. and stirred at this temperature for 12 h. After cooling to room temperature, the mixture is neutralized with acetic acid and the solid is filtered off with suction. The product is washed with 80% strength isopropanol until the conductivity of the filtrate is 35 µS. It is subsequently washed a further two times with acetone, then dried at 70° C. The yield is 79 g, the sodium sulfate content 8.0% and the nitrogen content 0.40%. This corresponds to a degree of substitution of the piperidinoethyl group of 0.08 and to a reagent yield of 23%. The 2% strength solution of the product in water has a viscosity of 2200 mPa.s (25° C. Höppler viscometer) and the water-insoluble fraction is 1.6%.

EXAMPLE 2

Process Variant 1

80 g of hydroxyethylcellulose (Tylose H 4000) are suspended in 400 g of isopropanol in a 2 litre glass reactor. A solution of 16.0 g of sodium hydroxide in 19 ml of water and 21.0 g of N-(2-sulfatoethyl)piperazine in 78 ml of water is added to this suspension. The reactor is closed and inertized with nitrogen. The mixture is stirred at room temperature for 30 min for homogenization. It is then heated to an internal temperature of 90° C. and stirred at this temperature for 4 hours. After cooling to room temperature, the mixture is neutralized with acetic acid and the solid is filtered off with suction. The product is washed with 80% strength isopropanol until the conductivity of the filtrate is <50 µS. It is subsequently washed a further two times with acetone, then dried at 70° C. The yield is 93 g, the sodium sulfate content 9.3% and the nitrogen content 1.1%. This corresponds to a degree of substitution of the piperazinoethyl group of 0.12 and to a reagent yield of 36%. The 2% strength solution of the product in water has a viscosity of 1600 mPa.s (25° C., Höppler viscometer) and the water-insoluble fraction is 1.2%.

EXAMPLE 3

Process Variant 2

68 g of spruce pulp (5% moisture) are mixed in a mixer for 1 hour with a solution of 115 ml of water, 80 ml of isopropanol, 16.8 g of N-(2-sulfatoethyl)piperazine and 20.8 g of sodium hydroxide. The mixture is poured into a glass dish and transferred to a vacuum drying oven. The oven is evacuated and heated for 1 h at 40° C. and then for 16 h at 120° C. After cooling, the mixture is suspended using 1.5 l of 50% strength isopropanol and adjusted to a pH of 9 using acetic acid. The solid is filtered off with suction and washed with 50% strength isopropanol until sulfate ions are no longer detectable in the filtrate using barium chloride solution. It is then washed a further two times with acetone and dried at 70° C. The yield is 68 g.

The cellulose pretreated in this way is transferred to a 2 litre glass reactor and suspended in 544 g of isopropanol. A solution of 17.6 g of sodium hydroxide in 115 g of water is added, the reactor is closed and inertized with nitrogen and the mixture is stirred for 30 min at room temperature. 99 ml of ethylene oxide are allowed to run in via a measuring funnel and the mixture is heated for 2 h at an internal temperature of 80° C. After cooling, the mixture is neutralized to phenolphthalein using hydrochloric acid, and the solid is filtered off with suction and washed with 80% strength isopropanol until salt-free. The solid is washed a further two times with acetone and dried at 70° C. in a drying oven. The yield is 94 g. A 2% strength solution of the product in water has a viscosity of 45 mPa.s (25° C., Höppler viscometer) and is soluble to 98% in water. The molar degree of substitution, based on hydroxyethyl, is 2.59 and, based on piperazinoethyl, 0.19 (calculated as nitrogen content), corresponding to a reagent yield of 48%.

EXAMPLE 4

Process Variant 2

Example 3 is repeated, but the reaction temperature in the vacuum drying oven is only 100° C. (16 hours). The subsequent etherification with ethylene oxide is carried out as described in Example 3.

A 2% strength solution of the product in water has a viscosity of 133 mPa.s (25° C., Höppler viscometer). The solubility in water in 98%, and the molar degree of substitution is 2.83 with respect to hydroxyethyl and 0.02 with respect to piperazinoethyl, corresponding to a reagent yield of 50%.

EXAMPLE 5

Process Variant 2

68 g of spruce pulp (5% moisture) are suspended in 570 g of toluene in a 2 litre glass reactor and treated with a solution of 16.8 g of N-sulfatoethylpiperazine and 14.4 g of sodium hydroxide in 64.8 g of water. The reactor is closed and inertized with nitrogen. The mixture is stirred for 1 hour at room temperature, then for 18 hours at 115° C. The mixture is cooled and neutralized to phenolphthalein using acetic acid. The product is filtered off with suction and washed with water until sulfate is no longer detectable in the filtrate using barium chloride. It is then washed a further two times with acetone and dried at 70° C. The yield is 66 g. The cellulose pretreated in this way is transferred to a 2 litre glass reactor and suspended in 544 g of isopropanol. A solution of 17.6 g of sodium hydroxide in 115 g of water is added, the reactor is closed and inertized with nitrogen and the mixture is stirred for 30 min at room temperature. 99 ml of ethylene oxide are allowed to run in through a measuring funnel and the mixture is heated for 2 hours at an internal temperature of 80° C. After cooling, the mixture is neutralized to phenol-phthalein using hydrochloric acid, and the solid is filtered off with suction and washed with 80% strength isopropanol until salt-free. The solid is washed a further two times with acetone and dried at 70° C. in a drying oven. The yield is 96 g. A 2% strength solution of the product in water has a viscosity of 15600 mPa.s (25° C., Höppler viscometer) and is soluble to 97% in water. The molar degree of substitution, based on hydroxy-ethyl, is 2.67 and, based on piperazinoethyl, 0.062 (calculated from nitrogen content), corresponding to a reagent yield of 31%.

EXAMPLE 6

Comparison example 100 g of hydroxyethylcellulose (Tylose H 4000) are suspended in 450 g of isopropanol in a 2 litre glass reactor. A solution of 13.6 g of sodium hydroxide in 20 ml of water and 24.0 g of 2-aminoethylsulfuric acid in 40 ml of water is added to this suspension. The reactor is closed and inertized with nitrogen. The mixture is stirred for 30 min at room temperature for homogenization. It is then heated to an internal temperature of 80° C. and stirred at this temperature for 12 hours. After cooling to room temperature, the mixture is neutralized with acetic acid and the solid is filtered off with suction. The product is washed with 80% strength isopropanol until the conductivity of the filtrate is <50 μS. It is washed a further two times with acetone, then dried at 70° C. The yield is 97 g, the sodium sulfate content 9.3% and the nitrogen content 0.10%. This corresponds to a degree of substitution of the aminoethyl group of 0.02 and to a reagent yield of 4%.

What is claimed is:

1. A process for the preparation of a water-soluble polysaccharide ether from (a) a polysaccharide ether starting material in which an ether group of said polysaccharide ether is an alkyl ether, a hydroxyalkylether, a carboxyalkylether, or a sulfoalkylether, or (b) an essentially non-etherified polysaccharide starting material, comprising:

(a) reacting a said polysaccharide ether, in the presence of a base, with an N,N-disubstituted aminoalkylsulfuric acid ester of the formula II

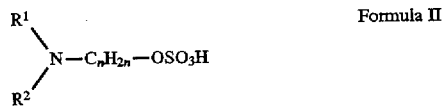

Formula II in which

R¹ and R² together are a cycloaliphatic radical having 4 to 10 carbon atoms, which is optionally substituted by hydroxyl, alkoxy or amino groups, and in which the cycloaliphatic radical is optionally additionally substituted to contain oxygen, sulfur or nitrogen atoms, and n is an integer from 2 to 10, or (b) reacting a said essentially non-etherified polysaccharide, in the presence of a base, with an alkyl ether-forming, a hydroxyalkylether-forming, a carboxyalkylether-forming, or a sulfoalkylether-forming alkylating agent, or a combination of said alkylating agents, and a said N,N-disubstituted aminoalkylsulfuric acid ester of said formula II, to obtain a water-soluble polysaccharide ether product containing (i) an alkyl, hydroxyalkyl, carboxyalkyl, or sulfoalkyl substituent, or a combination of said substituents, and (ii) the N,N-disubstituted aminoalkyl group of said formula II.

2. The process as claimed in claim 1, wherein said water-soluble polysaccharide ether product has a mean degree of substitution with N,N-disubstituted aminoalkyl groups of 0.01 to 2 mol per mole of monosaccharide unit of said water-soluble polysaccharide product.

3. The process as claimed in claim 1, wherein said water-soluble polysaccharide ether product is soluble in water to more than 95% with formation of a 0.5% strength solution.

4. The process as claimed in claim 1, wherein the polysaccharide ether starting material of said step (a) has been obtained by reacting an essentially non-etherified polysaccharide with a said alkylating agent or a combination of said alkylating agents.

5. The process as claimed in claim 1, wherein, in said step (b), the essentially non-etherified polysaccharide is a water-insoluble polysaccharide which is first reacted with said N,N-disubstituted aminoalkylsulfuric acid ester of said formula II and then with said alkylating agent or combination of alkylating agents.

6. The process as claimed in claim 1, wherein the reaction with said N,N-disubstituted aminoalkylsulfuric acid ester of said formula II is carried out at temperatures from 60° C. to 160° C. in the presence of 1.2 to 5 mol of alkali per mole of aminoalkyl sulfate and 5 to 30 mol of water per mole of monosaccharide units of a said starting material.

7. The process as claimed in claim 1, wherein the reaction of a said starting material with the said N,N-disubstituted aminoalkylsulfuric acid ester of said formula II is carried out in the presence of up to 20 parts by weight of an inert organic solvent in which the water-soluble polysaccharide ether product is essentially insoluble.

8. The process as claimed in claim 7, wherein said inert organic solvent is a lower alcohol, a ketone, an ether, or a hydrocarbon.

* * * * *